Sept. 8, 1936.    W. E. KRUEGER    2,053,615
CONNECTER
Filed March 21, 1930
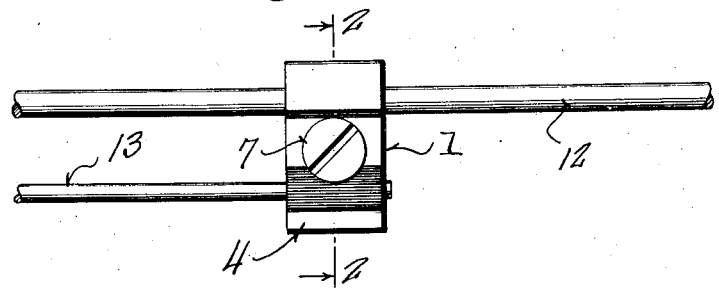
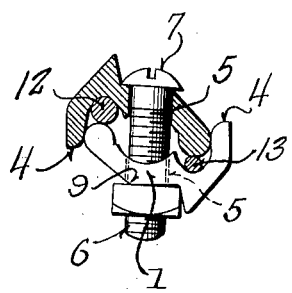 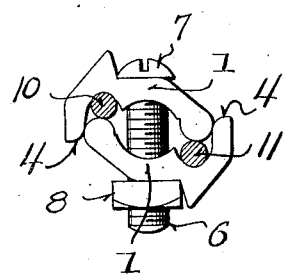
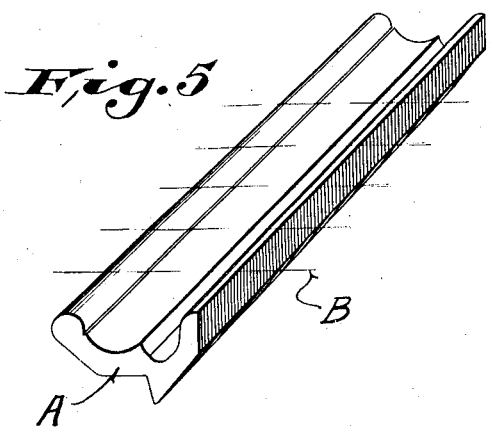 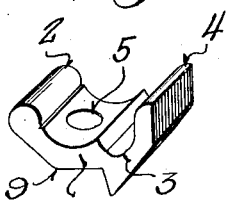
William E. Krueger, Inventor
By Arthur R. Woolfolk, Attorney Patented Sept. 8, 1936

2,053,615

UNITED STATES PATENT OFFICE 2,053,615

CONNECTER

William E. Krueger, South Milwaukee, Wis., assignor to Line Material Company, South Milwaukee, Wis., a corporation of Delaware Application March 21, 1930, Serial No. 437,762

3 Claims. (Cl. 173—263)

This invention relates to connecters.

Objects of this invention are to provide a novel form of connecter which is so made that it may be either attached to a continuous run of wire for connecting a tap wire, or it may be used for connecting the ends of two wires, and which is primarily intended for connecting services to eliminate the necessity of soldering.

Further objects are to provide a connecter which is adapted to receive wires either of the same or of different sizes and which is so made that it will adjust itself to such wires, and which will secure a very extensive contact with each of the wires, the connecter being so made that it partially encircles each wire, thereby permitting the use of even stranded wires without danger of separating the strands of the wires.

Further objects are to provide a connecter which is so constructed that the bolt for applying pressure will adjust itself, as the connecter adjusts itself to different sizes of wire, without any tendency on the part of the bolt to shift the connecter and cause binding of its parts with the bolt, which might result in improper or unequal pressure on the wires, and to provide a connecter which is so made that its halves are duplicates and are so constructed that turning of the bolt is prevented, thereby permitting the tightening of the bolt or screw solely by the use of a screw driver, or other tool.

Further objects are to provide a novel form of connecter which is of extremely simple construction, which is formed of extruded stock, preferably copper stock, and which is cut off into appropriate lengths by a shearing punch or other suitable machine and which, therefore, may be made with the utmost cheapness, although the effectiveness and low resistance of the connection ultimately made by the connecter is in no way impaired.

An embodiment of the invention is shown in the accompanying drawing, in which:

Figure 1 is a view of the connecter showing it used to attach a tap wire to a continuous run of wire.

Figure 2 is a sectional view on the line 2—2 of Figure 1, one half only being in section.

Figure 3 is an end view of the connecter showing it applied to two wires of the same size.

Figure 4 is a view of one of the half sections of the connecter, such view being in perspective.

Figure 5 is a perspective view intended to indicate an indeterminate length of extruded copper stock or other highly conducting stock from which the connecter is made.

Referring to the drawing, it will be seen that the connecter comprises two duplicate half sections, each of which is provided with a channeled body portion 1 provided with two arms. One of the arms terminates in a rounded or cylindrical rib 2, and the other is provided with a cylindrical channel 3 and with an outer lip 4. It is, of course, to be understood that the channel 3 and the rib or pressure lip 2 may be made in other shapes than strictly cylindrical, although it has been found that an approximately cylindrical construction is highly effective.

Each half section is provided with a hole 5 for the reception of the clamping screw or bolt 6. This clamping screw is preferably provided with a slotted head 7 at one end, a nut 8 being threaded on the shank of the screw, as shown most clearly in Figures 2 and 3.

It is to be noted particularly from Figure 2, that the hole 5 is somewhat larger than the screw shank and permits relative motion of the screw and the two half sections of the connecter. Further, it will be seen from Figures 2 and 4 that the outer portion of each half section is provided with a rib 9 against which the bolt or the head of the screw may bear, thus permitting the screw to freely and correctly adjust itself when it is tightened, irrespective of the sizes of the wire engaged by the connecter. It is to be noted particularly from Figures 2 and 4 that the bolt engaging rib 9 is located on one side of the aperture. In other words, it does not extend diametrically through the aperture. This bolt engaging rib when wires of different sizes are employed, receives the pressure from the fastening means, such, for instance, as the bolt and nut in Figure 2, and as shown in Figure 2 the bearing is against the rib. Note particularly in Figure 2 that there is the spacing between the bolt and the face of the connecter on the other side of the bolt from the rib 9. This allows the plates to fulcrum as distinguished from rolling, which would occur if a rounded surface instead of a fulcrum point had been employed. When wires of the same size are employed, the head of the bolt and the nut may bear against the flat faces of the members. However, when wires of different sizes are used, it is obvious that either the head of the bolt or the nut bears against the fulcrum rib 9. Figures 2 and 3 show these two conditions. For example, when the connecter receives wires of the same size as indicated at 10 and 11 in Figure 3, the half sections occupy a certain relative position. However, when the connecter receives wires of different sizes, as shown at 12 and 13 in Figure 2, the half sections of the connecter occupy a different relative position. The connecter, however, as previously described, is so made that it can accurately adjust itself without any binding of the screw with the half sections of the connecter which might prevent such motion. Instead, the parts freely adjust themselves and the wires are tightly clamped and forced into intimate binding engagement within the slot or channel 3 and against the projecting elongated tongue 2.

In this connection it is to be noted that the connecter partially encircles the wires, and thus, even if a stranded wire is used, separation of the strands cannot occur even when pressure is applied.

The connecter is adapted for a great variety of uses, and has been found to be particularly efficacious for connecting services to eliminate the necessity of soldering. There is no chance of the connecters heating up when current flows, due to the fact that the resistance of the joint is very low indeed, the connecter being preferably made of copper, although it can be made of other material having a good conductivity. The connecter may be used to connect the ends of two wires either of the same or different sizes, or it may be used to connect a continuous run of wire to a tap wire, for instance, as shown in Figure 1.

The connecter is so designed that it may be most cheaply and rapidly manufactured, as will appear immediately below.

Preferably the connecter is made from an indeterminate length of extruded copper stock, as indicated at A in Figure 5. This copper stock is extruded in the exact cross sectional shape of a connecter half section. It is cut into lengths, as indicated by the dot and dash lines B, by a shearing punch to form a half section, and the holes 5 are punched either before or after this shearing operation.

It will thus be seen that the connecter may be made with the utmost cheapness; the half sections, being identical, do not necessitate differently shaped parts. Instead, as stated, one continuous or indeterminate length of stock may be extruded and thereafter may be cut and punched to form the half section.

It will also be seen that the connecter is very easy to apply and insures a good joint, having both high electrical conductivity and great mechanical strength.

Although this invention has been described in considerable detail, it is to be understood that such description is intended as illustrative rather than limiting, as the invention may be variously embodied and is to be interpreted as claimed.

I claim:

1. A connecter comprising a pair of substantially similar sections adapted to receive conductors between them, each section having a bolt receiving aperture therethrough, a bolt passing through said apertures and having a shank of materially less diameter than said apertures, each of said sections having an outer fulcrum rib, said bolt having a head at one end bearing against one of said ribs and having a nut at the other end bearing against the other of said ribs, whereby said sections may fulcrum about said ribs without rolling, said sections each having a wire receiving groove and a lip immediately adjacent said groove and projecting inwardly and having an inwardly directed rib on the opposite side of the section from said groove, the last mentioned rib of one section adapted to fit within the groove of the other section and to clamp conductors within said grooves.

2. As a new article of manufacture, a clamp comprising two substantially identical clamping plates; each plate having a bolt receiving aperture, a wire receiving groove on one side of the aperture, a wire engaging rib on the other side of the aperture substantially parallel to said groove and complementary to the groove in the other of said plates, a lip extending from said groove, and a bolt engaging rib upon which a bolt may seat, said wire engaging rib being one of the side margins of the plate and said lip being the opposite side margin of said plate; and a bolt extending through the apertures in said plates, whereby to draw the plates into clamping engagement with wires disposed in the grooves, said bolt engaging rib being disposed at one side of said aperture and substantially parallel to said groove and said wire engaging rib.

3. A connecter comprising a pair of substantially similar sections adapted to receive conductors between them, each section having a bolt receiving aperture therethrough, a bolt passing through said apertures and having a shank of materially less diameter than the diameter of said apertures, each of said sections having an outer side and an inner side, the outer side having a fulcrum rib formed thereon, the inner side having a wire receiving groove bounded by a marginal guiding lip and having a wire engaging rib provided with a convex surface, the wire engaging rib of one section contacting with and being guided by the guiding lip of the other section, said bolt having a head and a nut bearing on the outer sides of said sections respectively and said fulcrum rib providing a fulcrum point against which the head or the nut or said bolt may bear when wires of dissimilar sizes are clamped between said sections, whereby said sections will adjust themselves to the dissimilar sized wires without rolling action, and whereby the wire engaging rib of one section will at all times be guided by the guiding lip of the other section.

WILLIAM E. KRUEGER.